(12) United States Patent
Findeisen et al.

(10) Patent No.: US 6,300,697 B1
(45) Date of Patent: Oct. 9, 2001

(54) CIRCUIT CONFIGURATION FOR CONNECTING UP THE STATOR WINDINGS OF A BRUSHLESS ELECTRONICALLY COMMUTATED MOTOR

(75) Inventors: Antje Findeisen; Thomas Kramer; Dietrich Von Knorre, all of Oldenburg (DE)

(73) Assignee: Temic Automotive Electric Motors GmbH, Oldenburg (DE)

( * ) Notice: Subject to any disclaimer, the term of this patent is extended or adjusted under 35 U.S.C. 154(b) by 0 days.

(21) Appl. No.: 09/646,594
(22) PCT Filed: Mar. 6, 1999
(86) PCT No.: PCT/EP99/01458
§ 371 Date: Sep. 19, 2000
§ 102(e) Date: Sep. 19, 2000
(87) PCT Pub. No.: WO99/48188
PCT Pub. Date: Sep. 23, 1999

(30) Foreign Application Priority Data

Mar. 19, 1998 (DE) .............................. 198 12 019

(51) Int. Cl.$^7$ .................................................. H02K 11/00
(52) U.S. Cl. ................... 310/68 B; 310/71; 310/DIG. 6; 310/68 R; 439/189
(58) Field of Search .................................. 310/68 B, 71, 310/DIG. 6, 68 R; 439/189, 675; 336/192; 339/18 R (56) References Cited

U.S. PATENT DOCUMENTS

| | | | |
|---|---|---|---|
| 3,984,714 | * 10/1976 | Grozinger et al. | 310/194 |
| 4,593,464 | * 6/1986 | Williams et al. | 29/879 |
| 4,689,023 | * 8/1987 | Strong, III et al. | 439/189 |
| 4,845,396 | * 7/1989 | Huber | 310/239 |
| 5,157,293 | 10/1992 | Escaravage . | |
| 5,548,458 | 8/1996 | Pelstring et al. . | |
| 5,828,147 | 10/1998 | Best et al. . | |

FOREIGN PATENT DOCUMENTS

| | | |
|---|---|---|
| 0477054 | 3/1992 | (EP) . |
| 0645542 | 3/1996 | (EP) . |
| 0777312 | 6/1997 | (EP) . |
| 2651933 | 3/1991 | (FR) . |
| WO97/26700 | 7/1997 | (WO) . |

* cited by examiner

Primary Examiner—Elvin Enad
Assistant Examiner—Thanh Lam
(74) Attorney, Agent, or Firm—W. F. Fasse; W. G. Fasse (57) ABSTRACT

The invention relates to a circuit configuration for connecting the stator windings of a brushless, electronically commutated motor, especially as a drive motor for an automobile fan drive. The configuration comprises a circuit board (63) with conducting paths, each of which is connected to the wire leads of the winding coils of each phase winding and one of which is connected to the ends of winding coils of all of the phase windings. This electronically commutated motor simplifies the interconnection of the stator windings in that the circuit board (63) includes an annular disk-shaped support plate (65) which, together with the stator assembly, is attached by a hub (67) to a bearing support pipe on the motor flange. The conducting paths are made of stamped conductor rails (73, 75, 77, 79) which are fixed on the support plate (65), concentrically to the hub (67).

8 Claims, 7 Drawing Sheets

CIRCUIT CONFIGURATION FOR CONNECTING UP THE STATOR WINDINGS OF A BRUSHLESS ELECTRONICALLY COMMUTATED MOTOR

FIELD OF THE INVENTION

The invention relates to a circuit configuration for connecting the stator windings of a brushless, electronically commutated motor.

BACKGROUND INFORMATION

Electronically controlled electric motors are coming more and more to the fore in a number of areas of application. In this connection electric motors are involved in which the required periodic switching of coils is no longer performed by a commutator, but rather by electronic switching devices. The electronic switching devices can include for example suitable sensors which determine when the stator and the rotor for the coils about to be switched, are in a position relative to each other that is favorable to or requires switching. It is understood that the electronic switching devices must also ensure that current is fed to the respective coils in the appropriate direction.

It is also known to use permanent magnets either for the stator poles or for the rotor poles in electronically controlled electric motors. Permanent magnets offer a number of advantages, such as no current consumption, small dimensions, and simple manufacturing and assembly. Such electric motors are used today in many technical areas, such as, for example, also in the automobile industry as drive motors for radiator fans or servo-devices. The available space for installing an electrically operated fan for cooling the radiator is very limited, particularly in automobiles in which the combustion motor is installed lengthwise in the travel direction. Conventional permanent magnet motors cannot be used because of their large axial structural length.

European Patent Publication EP 0,645,542 discloses an automobile cooling fan with an electric (EC) motor wherein the windings of the armature and other electronic components are connected with a printed circuit on a carrier or support. In that case, connecting the free ends of the windings with the printed circuit is still relatively complicated and costly.

U.S. Pat. No. 5,548,458 discloses a circuit arrangement for connecting the stator windings of a brushless, electronically commutated electric motor that is provided for driving computer hard disc drives. That disclosure shows concentrically arranged conductor paths on a side of an annular disk-shaped support plate that faces away from the stator assembly.

The ends and/or the leads of the winding wires are fastened by means of solder pads on the support plate, whereby the solder pads are connected by connecting conductors with the current paths.

Furthermore, the European Patent Publication EP 0 777 312 A2 discloses a stator for electric motors that comprises a stator assembly, stator windings, and a circuit configuration for the stator windings arranged on an endface of the stator assembly. The circuit configuration particularly has an insulating part with groove-shaped chambers for receiving electrical connection leads that are insulated relative to each other for connecting the winding ends of the stator windings. The publication does not, however, disclose a star connection with a star point.

SUMMARY OF THE INVENTION

It is an object of the invention to provide a circuit configuration for connecting the stator windings of a brushless, electronically commutated electric motor that will provide simple stator winding interconnections in a flat construction. This object has been achieved by the combination of the following features of a brushless, electonically commutated drive motor. According to the invention the motor has a stator with three phase windings angularly spaced by 120° and a supporting circuit board arranged so as to face the stator on its flange side. The circuit board has an annular disk-shaped support plate that is fixedly mounted by a hub to a bearing support pipe on a motor flange. The circut board further has conductor rails fixed on a side of the support plate facing away from stator winding coils. The conductor rails are arranged concentrically about the hub on the support plate. One each of the conductor rails is connected with winding leads of each of the stator winding coils of one of the phase windings. One of the conductor rails is connected with leads of the stator winding coils of all phase windings. A first conductor rail which is arranged closet to the hub of the support plate has angled connector tabs adapted for connecting with said leads of the stator winding coils of all phase windings through holes passing through the support plate between the ring-shaped hub of the support plate and the first conductor rail. Three additional conductor rails forming second, third and fourth conductor rails are concentrically arranged around the first conductor rail on the support plate. Connector tabs of the second, third, and fourth conductor rails are provided for connection with winding leads. These connector tabs are arranged equidistant from the hub on the periphery of the support plate. The connector tabs of the second conductor rail pass through recessed guides under the third conductor rail and under the fourth conductor rail. The connector tabs of the third conductor rails pas through recessed guides under the fourth conductor rail.

The circuit board according to the invention, is made as an annular support plate and a stamped conductor rail, assures a simple connection of the circuit board with the free ends of the stator windings, in addition to a cost effective assembly. Further advantageous embodiments of the invention are described below.

BRIEF DESCRIPTION OF THE DRAWINGS

The invention will be described in more detail below, with reference to an example embodiment. Shown are in.

DETAILED DESCRIPTION OF THE INVENTION

Figure 1:
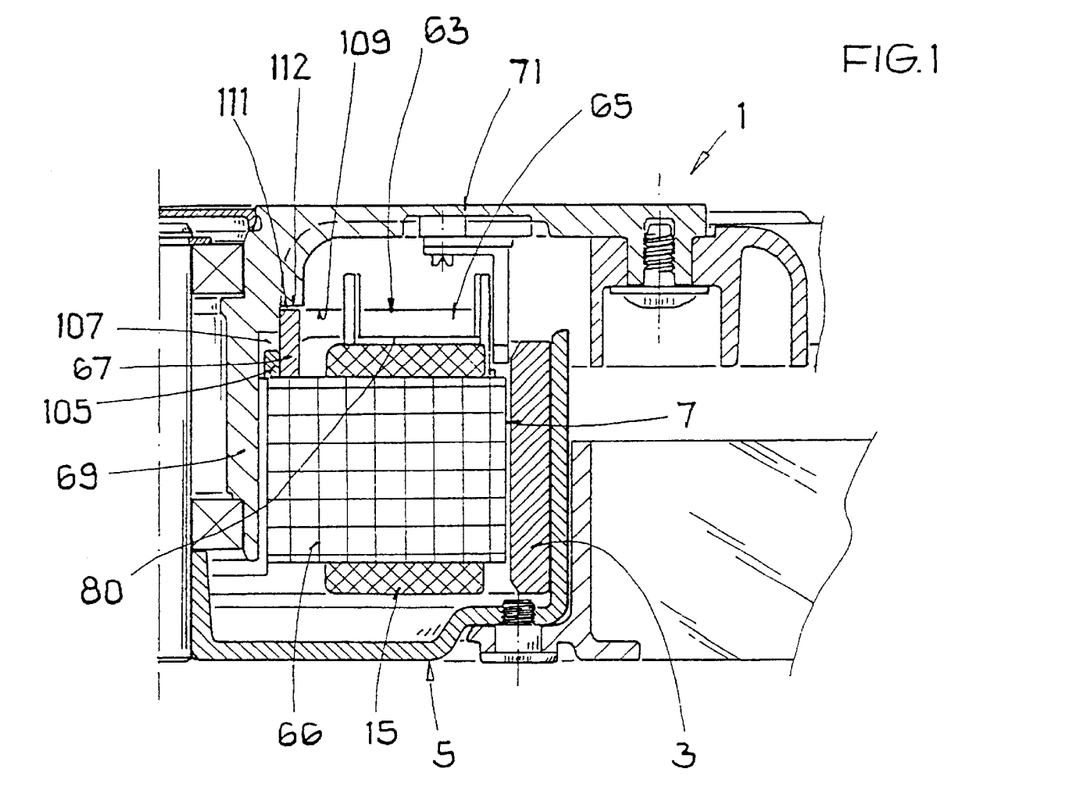
FIG. 1 a sectional view of an EC motor.

FIG. 1 shows a partial sectional view through a brushless, electronically commutated motor, also called an EC motor 1.

Figure 6:
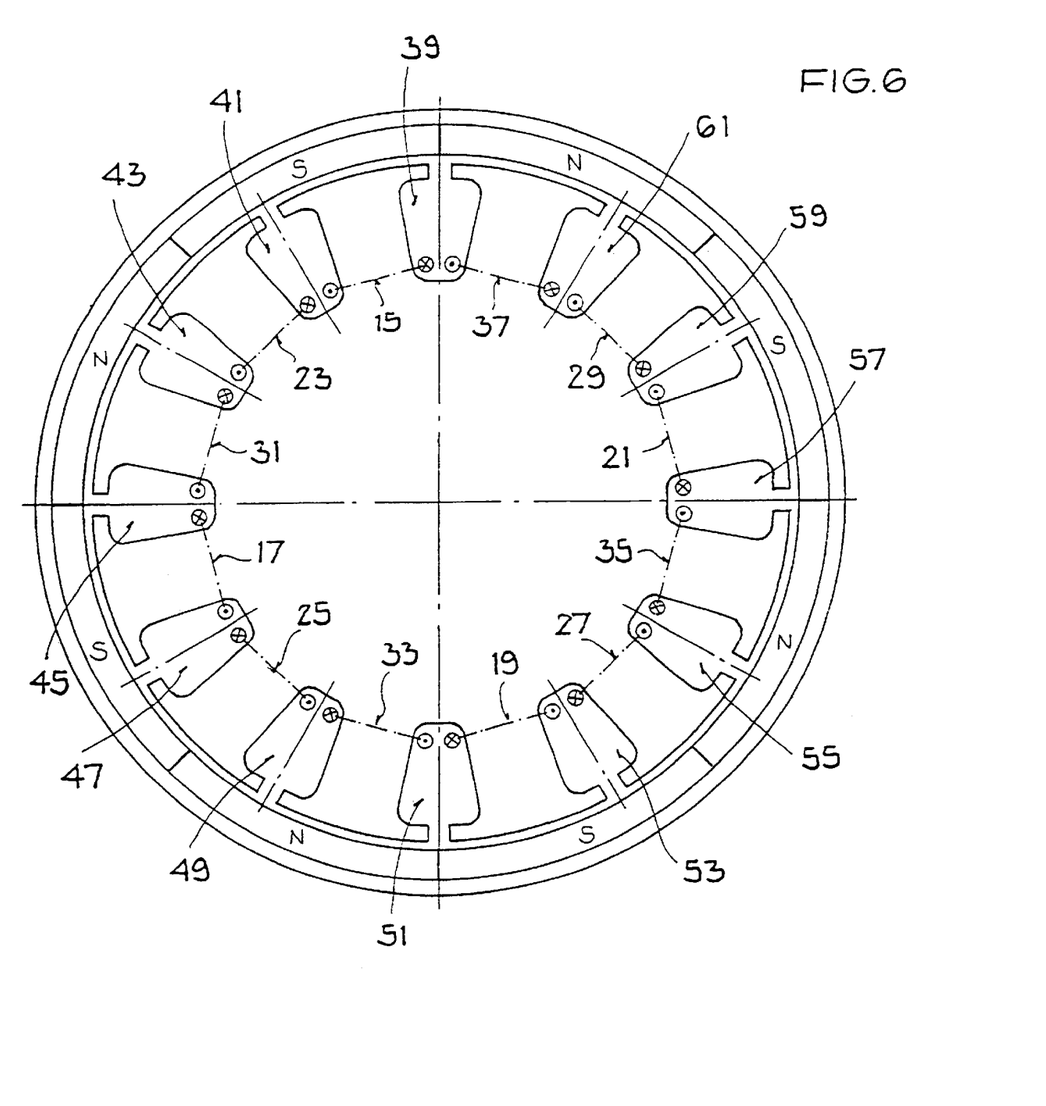
Figure 9:
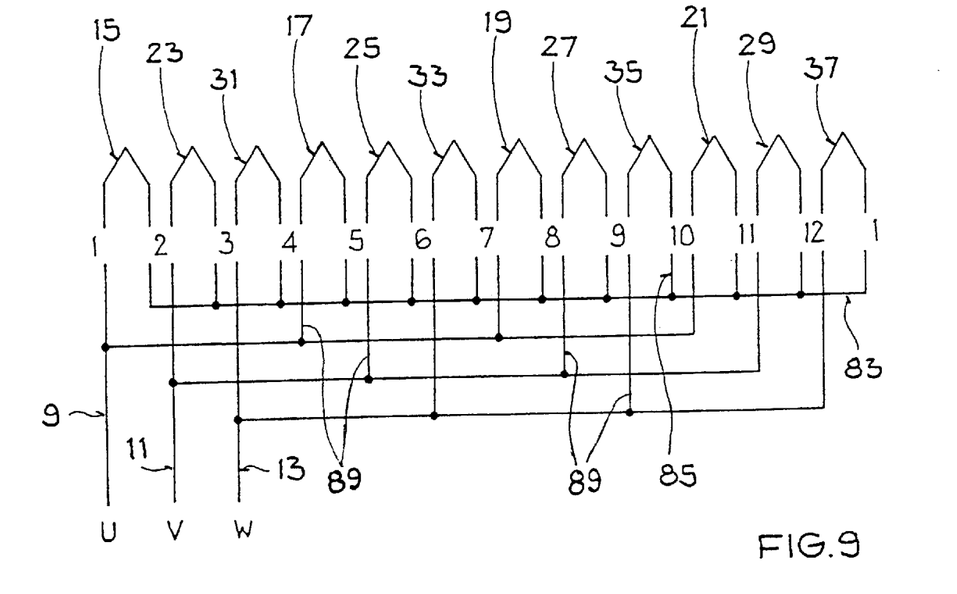

The EC motor 1 serves as the drive motor, particularly for an automobile fan drive having an outer rotor 5 with permanent magnets 3. A stator 7 with, for example, three phase windings 9, 11, 13 that are angularly spaced by 120°, is arranged in the outer rotor 5. Each phase winding 9, 11, 12 has, according to FIG. 9, four parallel-connected winding coils 15, 17, 19, 21, 23, 25, 27, 29, 31, 33, 35, 37 that are wound in the twelve winding grooves 39, 41, 43, 45, 47, 49, 51, 53, 55, 57, 59, 61 of the stator 7, as shown in FIG. 6.

Figure 2:
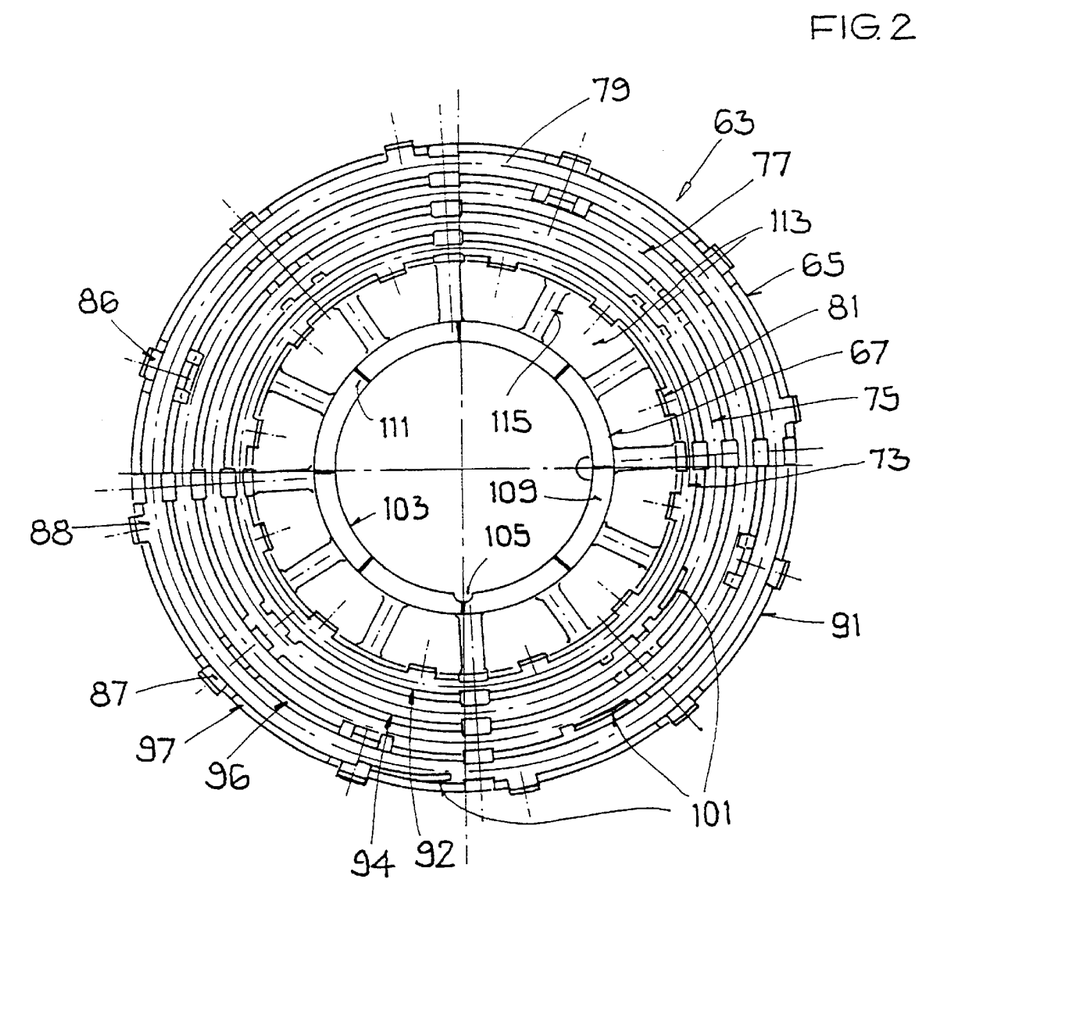
FIG. 2 a plan view of the circuit board.
Figure 3:
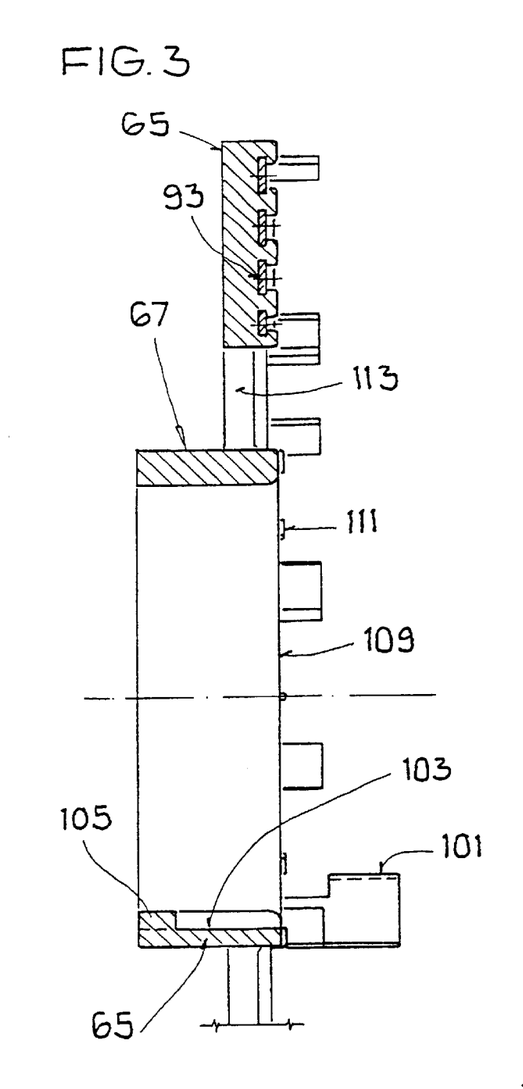
FIG. 3 a sectional view through the circuit board, in accordance with the section line A—A of FIG. 2, FIG. 4 a sectional view through the circuit board according to the section line B—B of FIG. 2, FIG. 5 a sectional view through the circuit board according to the section lines C—C of FIG. 2, FIG. 6 a plan view of the stator, FIG. 7 the conductor rails 1 and 3 after the stamping operation, FIG. 8 the conducting rails 2 and 4 after the stamping operation, and FIG. 9 a winding diagram for a 12-groove stator having four conductor rails.
Figure 4:
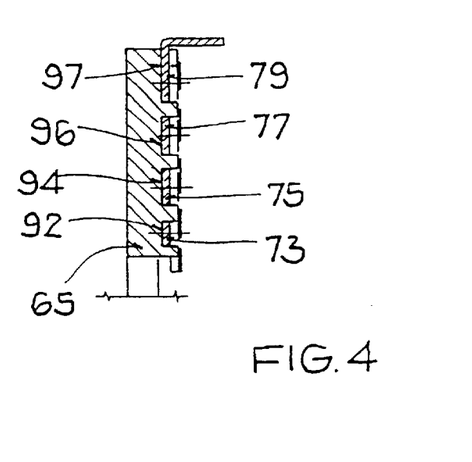
Figure 5:
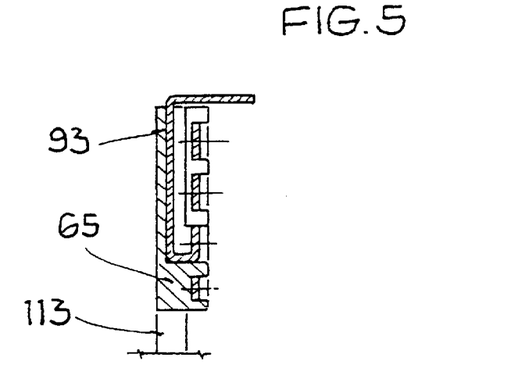

As shown in FIGS. 1 and 2, a circuit board 63 is used for connecting in parallel the winding coils 15 to 37 of the individual phase windings 9, 11, 13. The circuit board 63 comprises a support plate 65 made of electrically insulating material and is fixedly mounted by a hub 67, together with a stator assembly 66, on a bearing support pipe 69 on the motor flange 71. The conducting paths of the circuit board 63 are conducting rails 73, 75, 77, 79 which are secured on the side 80 of the support plate 65 concentrically to the hub 67. The side 80 of the support plate 65 faces away from the stator windings 15–37. These conductor rails 73, 75, 77, 79 are made of stamped parts. The first conductor rail 73 is arranged closest to the hub 67 on the support plate 65 and has angled connector tabs 81 for connecting the star point 83 with the ends 85 of the stator windings 15–37 of all phase windings 9, 11, 13. The three additional conductor rails 75, 77, 79 are fastened to the support plate 65 concentrically around the first conductor rail 73, whereby the connector tabs 86, 87, 88 on the conductor rails 75–79 for connecting with the winding leads 89, are arranged equidistant from the hub 67 on the periphery 91 of the support plate 65. In order to avoid intersection points between the rails 75–79 and the connector tabs 86, 87, 88, the connector tabs 86 of the second conductor rail 75 pass through recessed guides 93 in the support plate 65 under the third conductor rail 77 and under the fourth conductor rail 79. Similarly, the connector tabs 87 of the third conductor rail 77 pass through a recessed guide 95 under the fourth conductor rail 79. In this arrangement the conductor rails 73, 75, 77, 79 are embedded and fastened in a first plane in annular grooves 97 of the support plate 65. The recessed guides 93, 95 for receiving the connector tabs 86, 87 of the second 75 and the third conductor rails 77 are worked into a second plane in the support plate 65.

The conductor rails 73, 75, 77, 79 are arranged in the annular grooves 92, 94, 96, 97 into which the rails are pressable. It is within the framework of the invention to provide the support plate 65 with pawls or detents for fastening the conductor rails 73, 75, 77, 79 in the annular grooves 92, 94, 96, 97. Alternatively, the conductor rails 73, 75, 77, 79 can be fixed in the annular grooves 97 of the support plate 65 by hot caulking or pressing. Through-holes 113 are arranged in the support plate 65 between its ring-shaped hub 67 and the first conductor rail 63 for connecting the ends 85 of the stator windings 9–13. The chamber-like through-holes 113 are separated from each other by rib-like connecting lands 115.

Figure 7:
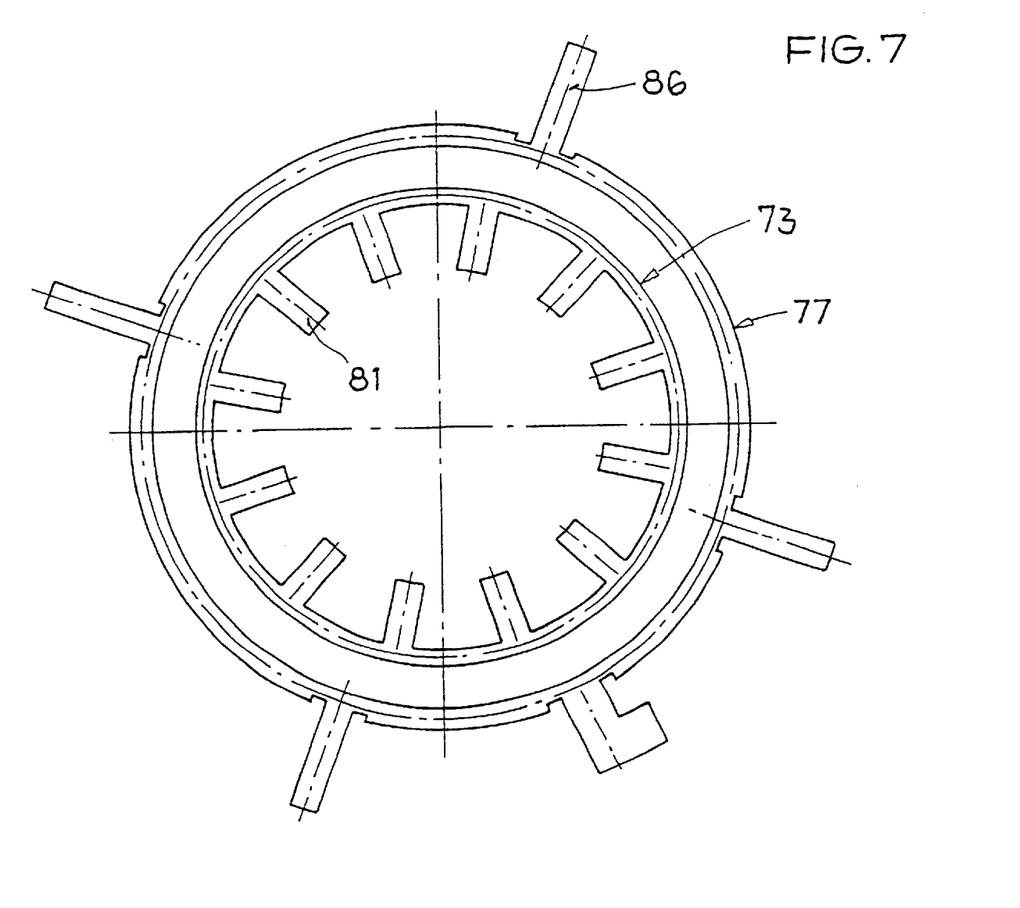
Figure 8:
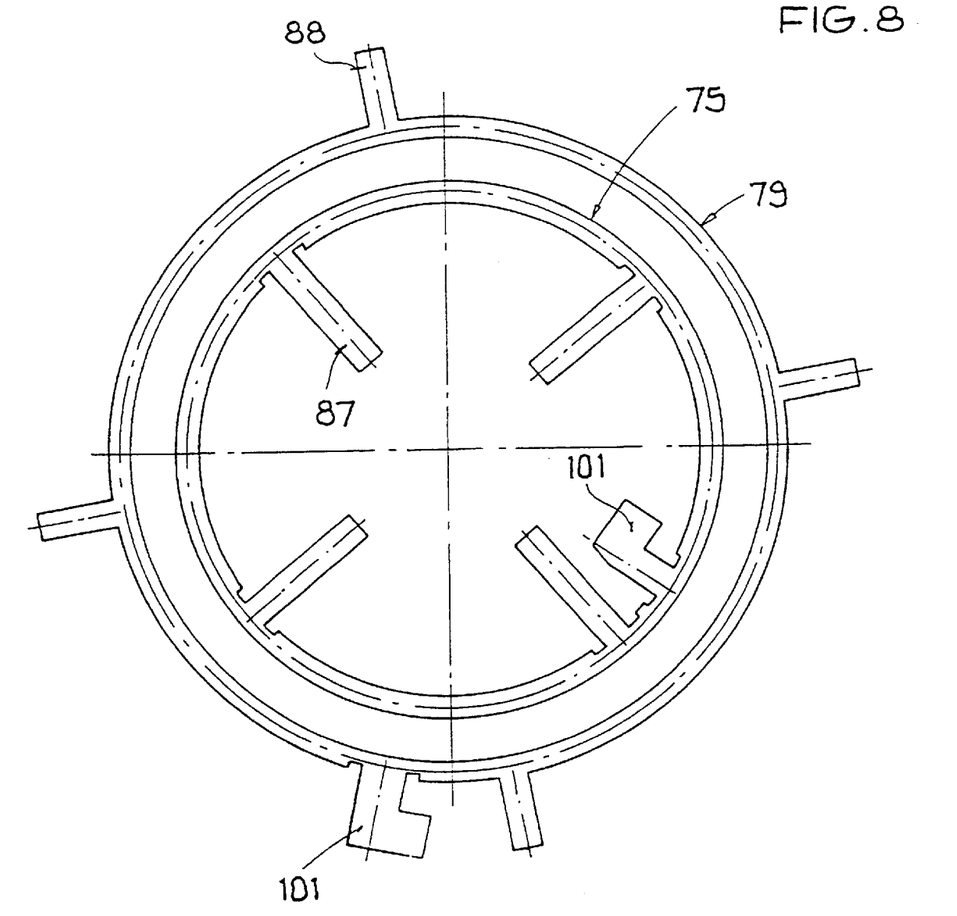

In the production of the conductor rails 73, 75, 77, 79 that are made of stamping material, the least possible waste of material is generated if the first 73 and the third conductor rail 77 are manufactured in a first stamping tool according to FIG. 7 and the second 75 and the fourth conductor rail 79 are produced in a second stamping tool according to FIG. 8, in a respective single stamping operation. The second, third and fourth conductor rails 75, 77, 79 are each provided with one connector tab 101 for a connecting lead.

In order to precisely position the circuit board 63 relative to the winding coil 15–37 of the stator 7, the hub 67 of the support plate 65 is provided with a centering projection 105 on its inner circumferential surface 103. The centering projection 105 snaps into the positioning recesses 107 of the bearing support pipe 69 on the motor flange 71.

Advantageously, a tolerance compensation is provided in the axial direction by means of an endface 109 of the hub 67 of the support plate 65 that faces the motor flange 71. The endface 109 has protruding compensating projections 111 which came to bear against an annular stop surface 112 on the bearing support pipe 69. In the assembled state, the compensating projections 111 are pressed flat more or less strongly.

What is claimed is:

1. A circuit configuration for connecting stator windings of a brushless, electronically commutated drive motor for an automobile fan drive, said motor having a stator (7) with three phase windings (9, 11, 13) angularly spaced by 120° and with a supporting circuit board (63) arranged so as to face the stator (7) on its flange side, wherein the circuit board (63) comprises an annular disk-shaped support plate (65) that is fixedly mounted by a hub (67) to a bearing pipe (69) on a motor flange (71), wherein the board has conductor rails (73, 73, 77, 79) fixed on a side (80) of the support plate facing away from stator windings (15–37), wherein the rails are arranged concentrically about the hub (67) on the support plate (65), and wherein one each of the conductor rails (73, 73, 77, 79) is connected with winding leads (89) of each of the stator winding coils (15–37) of one of the phase windings (9, 11, 13) and wherein one of the conductor rails (73, 73, 77, 79) is connected with leads (85) of the stator winding coils (15–37) of all phase windings (9, 11, 13), characterized in that the first conductor rail (73) arranged closest to the hub (67) of the support plate (65) has angled connector tabs (81), with which the ends (85) of the stator winding coils (15–17) of all phase windings (9, 11, 13) are connectable through through-holes (113) arranged in the support plate (65) between its ring-shaped hub (67) and the first conductor rail (73), that three additional conductor rails (75,77,79) are concentrically arranged around the first conductor rail (73) on the support plate (65), and that connector tabs (86, 87, 88) of the second, the third, and the fourth conductor rail (75,77,79) for connecting with the winding starts (89) are arranged equidistant from the hub (67) on the periphery (91) of the support plate (65), wherein the connector links (86) of the second conductor rail (75) pass through recessed guides under the third conductor rail (77) and under the fourth conductor rail (79), and wherein the connector tabs (86) of the third conductor rail (77) pass through recessed guides under the fourth conductor rail (79).

2. The circuit arrangement of claim 1, characterized in that the conductor rails (73, 75, 79) are inserted and secured in annular grooves (97) in a first plane of the support plate (65), and that the recessed guides (93, 95) for the connector tabs (86, 87) of the second and third conductor rail (75, 77) are worked into the support plate (65) in a second plane.

3. The circuit arrangement of claim 2, characterized in that the conductor rails (73, 75, 77, 79) are arranged in the annular grooves (97) with a press-fit.

4. The circuit arrangement of claim 3, characterized in that the support plate (65) comprises stops detents for snap-locking the conductor rails (73, 75, 77, 79) into the annular grooves (97).

5. The circuit arrangement of claim 3, characterized in that the conductor rails (73, 75, 77, 79) are fixed in the annular grooves (97) of the support plate (65) by hot caulking or pressing.

6. The circuit arrangement of claim 1, characterized in that the first and third conductor rails (73, 77) are manufacturable in a first stamping tool and the second and fourth conductor rails (75, 79) are manufacturable in a second stamping tool, each in one stamping operation, wherein the second, third, and fourth conductor rails (75, 77, 79) are each provided simultaneously with a connecting tab (101) for the connecting lead.

7. The circuit arrangement of claim 1, characterized in that the hub (67) of the support plate (65) has a centering projection (105) on its inner circumferential surface (103), wherein the projection is catchable into positioning recesses (107) for a precise angular positioning of the support plate (65) relative to the winding coils (15–37).

8. The circuit arrangement of claim 1, characterized in that the endface (109) of the hub (67) facing the motor flange (71) has compensating projections (111) that are brought into contact with a ring-shaped stop surface (113) on the bearing support pipe (69) for tolerance compensation in the axial direction.

\* \* \* \* \*

UNITED STATES PATENT AND TRADEMARK OFFICE
CERTIFICATE OF CORRECTION

PATENT NO. : 6,300,697 B1
DATED : October 9, 2001
INVENTOR(S) : Findeisen et al.

It is certified that error appears in the above-identified patent and that said Letters Patent is hereby corrected as shown below:

Title page,
Item [56], References Cited, FOREIGN PATENT DOCUMENTS,
Line 2, after "0645552", replace "3/1996" by -- 3/1995 --.

Column 2,
Line 33, after "rails", replace "pas" by -- pass --.

Column 4,
Lines 14 to 48 replace Claim 1 to read as follows.

1. A circuit arrangement for connecting stator windings of a brushless, electronically commutated drive motor for an automobile fan drive, said motor having a stator with three phase windings angularly spaced by 120°, said circuit arrangement comprising a supporting circuit board arranged so as to face said stator on its flange side, wherein the circuit board comprises an annular disk- shaped support plate that is fixedly mounted by a hub to a bearing support pipe on a motor flange, wherein said board further comprises conductor rails fixed on a side of said disk-shaped support plate facing away from stator winding coils, wherein said conductor rails are arranged concentrically about said hub on said disk-shaped support plate, and wherein one each of said conductor rails is connected with winding leads of each of said stator winding coils of one of said three phase windings, and wherein one of said conductor rails is connected with leads of said stator winding coils of all said three phase windings, wherein a first conductor rail of said conductor rails is arranged closest to said hub of said disk-shaped support plate and has angled connector tabs connectable with ends of said stator winding coils of all said three phase windings through through-holes arranged in said support plate between its ring-shaped hub and the first conductor rail, wherein three additional conductor rails forming a second, a third and a fourth conductor rail are concentrically arranged around the first conductor rail on said support plate, wherein connector tabs of said second, said third, and said fourth conductor rail for connection with winding ends are arranged equidistant from said hub on a periphery of said disk-shaped support plate, wherein said connector tabs of said second conductor rail pass through recessed guides under the third conductor rail and under the fourth conductor rail, and wherein said connector tabs of said third conductor rail pass through recessed guides under said fourth conductor rail.

UNITED STATES PATENT AND TRADEMARK OFFICE
CERTIFICATE OF CORRECTION

PATENT NO. : 6,300,697 B1
DATED : October 9, 2001
INVENTOR(S) : Findeisen et al.

It is certified that error appears in the above-identified patent and that said Letters Patent is hereby corrected as shown below:

Column 4,
Lines 49 to 54 replace Claim 2 to read as follows.

2. The circuit arrangement of claim 1, wherein said conductor rails are inserted and secured in annular grooves in a first plane of said support plate, and wherein said recessed guides for the connector tabs of the second and third conductor rail are worked into the support plate in a second plane.

Lines 55 to 57 replace Claim 3 to read as follows.
3. The circuit arrangement of claim 2, wherein said conductor rails are arranged in said annular grooves with a press-fit.

Lines 58 to 61 replace Claim 4 to read as follows.
4. The circuit arrangement of claim 2, wherein said support plate comprises stop detents for snap-locking said conductor rails into said annular grooves.

Lines 62 to 65 replace Claim 5 to read as follows.
5. The circuit arrangement of claim 2, wherein said conductor rails are fixed in said annular grooves of said support plate by hot caulking or pressing.

Line 66 to column 5: line 6 replace Claim 6 to read as follows.
6. The circuit arrangement of claim 1, wherein said first and third conductor rails are manufacturable in a first stamping tool and the second and fourth conductor rails are manufacturable in a second stamping tool, and wherein each in one stamping operation, wherein the second, third, and fourth conductor rails are each provided simultaneously with a connecting tab for the connecting lead.

Column 5, line 7, to Column 6,
Line 2, replace Claim 7 to read as follows.
7. The circuit arrangement of claim 1, wherein said hub of said support plate has a centering projection on its inner circumferential surface, and wherein said projection is catchable into positioning recesses for a precise angular positioning of said support plate relative to said winding coils.

UNITED STATES PATENT AND TRADEMARK OFFICE
CERTIFICATE OF CORRECTION

PATENT NO. : 6,300,697 B1
DATED : October 9, 2001
INVENTOR(S) : Findeisen et al.

It is certified that error appears in the above-identified patent and that said Letters Patent is hereby corrected as shown below:

Column 6,
Lines 3 to 8 replace Claim 8 to read as follows.

8. The circuit arrangement of claim 1, wherein an endface of said hub facing said motor flange has compensating projections that are brought into contact with a ring-shaped stop surface on said bearing support pipe for tolerance compensation in the axial direction.

Signed and Sealed this

Twenty-third Day of April, 2002

Attest:

JAMES E. ROGAN
*Attesting Officer*  *Director of the United States Patent and Trademark Office*